(12) United States Patent
Cosgrove et al.

(10) Patent No.: US 8,211,980 B2
(45) Date of Patent: Jul. 3, 2012

(54) POLYMERIC MATERIALS HAVING REDUCED TACK, METHODS OF MAKING THE MATERIALS AND CHEWING GUM COMPOSITIONS CONTAINING SUCH MATERIALS

(75) Inventors: Terence Cosgrove, Bristol (GB); Henry Craik-White, Tipperary (IE); Erol Ahmed Hasan, Bristol (GB); Voss Moore Gibson, Bristol (GB)

(73) Assignee: Revolymer Limited, London (GB)

( * ) Notice: Subject to any disclaimer, the term of this patent is extended or adjusted under 35 U.S.C. 154(b) by 1441 days.

(21) Appl. No.: 11/659,196

(22) PCT Filed: Aug. 12, 2005

(86) PCT No.: PCT/GB2005/003176
§ 371 (c)(1),
(2), (4) Date: Apr. 20, 2007

(87) PCT Pub. No.: WO2006/016179
PCT Pub. Date: Feb. 16, 2006

(65) Prior Publication Data
US 2008/0057153 A1    Mar. 6, 2008

(30) Foreign Application Priority Data
Aug. 12, 2004   (GB) .................................. 0417938.8

(51) Int. Cl.
C08F 279/02 (2006.01)
C08G 81/00 (2006.01)
A23G 4/08 (2006.01)

(52) U.S. Cl. ..... 525/190; 525/262; 525/266; 525/331.9; 426/4

(58) Field of Classification Search ...... 426/4; 525/185, 525/190, 25, 244, 254, 256, 262, 266, 331.9, 525/333.3
See application file for complete search history.

(56) References Cited

U.S. PATENT DOCUMENTS

| | | |
|---|---|---|
| 3,984,574 A | 10/1976 | Comollo |
| 4,241,091 A | 12/1980 | Stroz et al. |
| 4,518,615 A | 5/1985 | Cherukuri et al. |
| 4,886,857 A | 12/1989 | Ota et al. |
| 5,336,509 A | 8/1994 | McGrew et al. |
| 5,364,907 A | 11/1994 | Rolando et al. |
| 5,527,170 A | 6/1996 | Graves et al. |
| 5,580,590 A | 12/1996 | Hartman |
| 6,190,706 B1 | 2/2001 | Bunczek et al. |
| 6,344,222 B1 | 2/2002 | Cherukuri et al. |
| 6,359,067 B1 | 3/2002 | Miyawaki et al. |
| 6,441,126 B1 | 8/2002 | Cook et al. |
| 6,592,850 B2 | 7/2003 | Gmunder et al. |
| 6,949,264 B1 | 9/2005 | McGrew et al. |
| 6,986,907 B2 | 1/2006 | Phillips et al. |
| 7,183,351 B2 | 2/2007 | Auguste et al. |
| 2003/0049208 A1 | 3/2003 | Ream et al. |
| 2004/0097624 A1 | 5/2004 | Camus et al. |
| 2005/0054796 A1 | 3/2005 | Tsai |
| 2005/0084466 A1 | 4/2005 | Mullay et al. |
| 2005/0123489 A1 | 6/2005 | Cherukuri et al. |
| 2005/0228115 A1 | 10/2005 | Auguste et al. |
| 2006/0286143 A1 | 12/2006 | Shalaby et al. |
| 2008/0233233 A1 | 9/2008 | Soper et al. |

FOREIGN PATENT DOCUMENTS

| | | |
|---|---|---|
| EP | 0 284 428 A2 | 9/1988 |
| EP | 0 945 473 A1 | 3/1999 |
| EP | 0 997 501 A1 | 5/2000 |
| EP | 1 179 564 A1 | 2/2002 |
| GB | 1 025 958 | 5/1963 |
| GB | 2 351 430 A | 1/2001 |
| JP | 2005-272793 | 10/2005 |
| WO | WO 99/31994 | 7/1999 |
| WO | WO 99/31995 | 7/1999 |
| WO | WO 00/35298 | 6/2000 |

(Continued)

OTHER PUBLICATIONS

Visconte, L.L.Y., et al. "Kinetic Behavior of UV-sensitive Polymers from Modified Natural Rubber," *Polymers for Advanced Technologies*, vol. 4, pp. 490-195, (1993).

Jiang-Jen Lin et al.., "Synthesis, Characterization, and Interfacial Behaviors of Poly(oxyethylene)-Grafted SEBS Copolymers", Ind. Eng. Chem. Res., 2000, 39, pp. 65-71.

Jiang-Jen Lin et al.., "Preparation and electrostatic dissipating properties of poly(oxyalkylene)imide grafted polypropylene copolymers", Polymer, 2000, 41, pp. 2405-2417.

(Continued)

*Primary Examiner* — Humera Sheikh
*Assistant Examiner* — Saeeda Latham
(74) *Attorney, Agent, or Firm* — Oliff & Berridge, PLC

(57) ABSTRACT

A polymeric material having low tack which has a straight or branched chain carbon-carbon polymer backbone and a multiplicity of side chains attached to the backbone wherein the side chains, which are attached directly to carbon atoms of the polymer backbone, have the formula wherein $R^1$ is H, —C(O)$OR^4$ or —C(O)Q and $R^2$ is —C(O)$OR^4$ or —C(O)Q provided that at least one of $R^1$ and $R^2$ is the group —C(O)Q; $R^3$ is H or —CH$_3$; $R^4$ is H or an alkyl group having from 1 to 6 carbon atoms; Q is a group having the formula —O—(YO)$_b$—(ZO)$_c$—$R^{5'}$ wherein each of Y and Z is, independently, an alkylene group having from 2 to 4 carbon atoms and $R^5$ is H or an alkyl group having from 1 to 4 carbon atoms; a is 3 or 4 and each of b and c is, independently, 0 or an integer of from 1 to 125 provided that the sum b+c has a value in the range of from 10 to 250, preferably from 10 to 120. The polymeric material may be used to replace at least part of a water-insoluble gum base in a chewing gum composition to give a composition exhibiting reduced adhesion to surfaces.

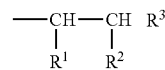

20 Claims, 5 Drawing Sheets

FOREIGN PATENT DOCUMENTS

Figure 1:
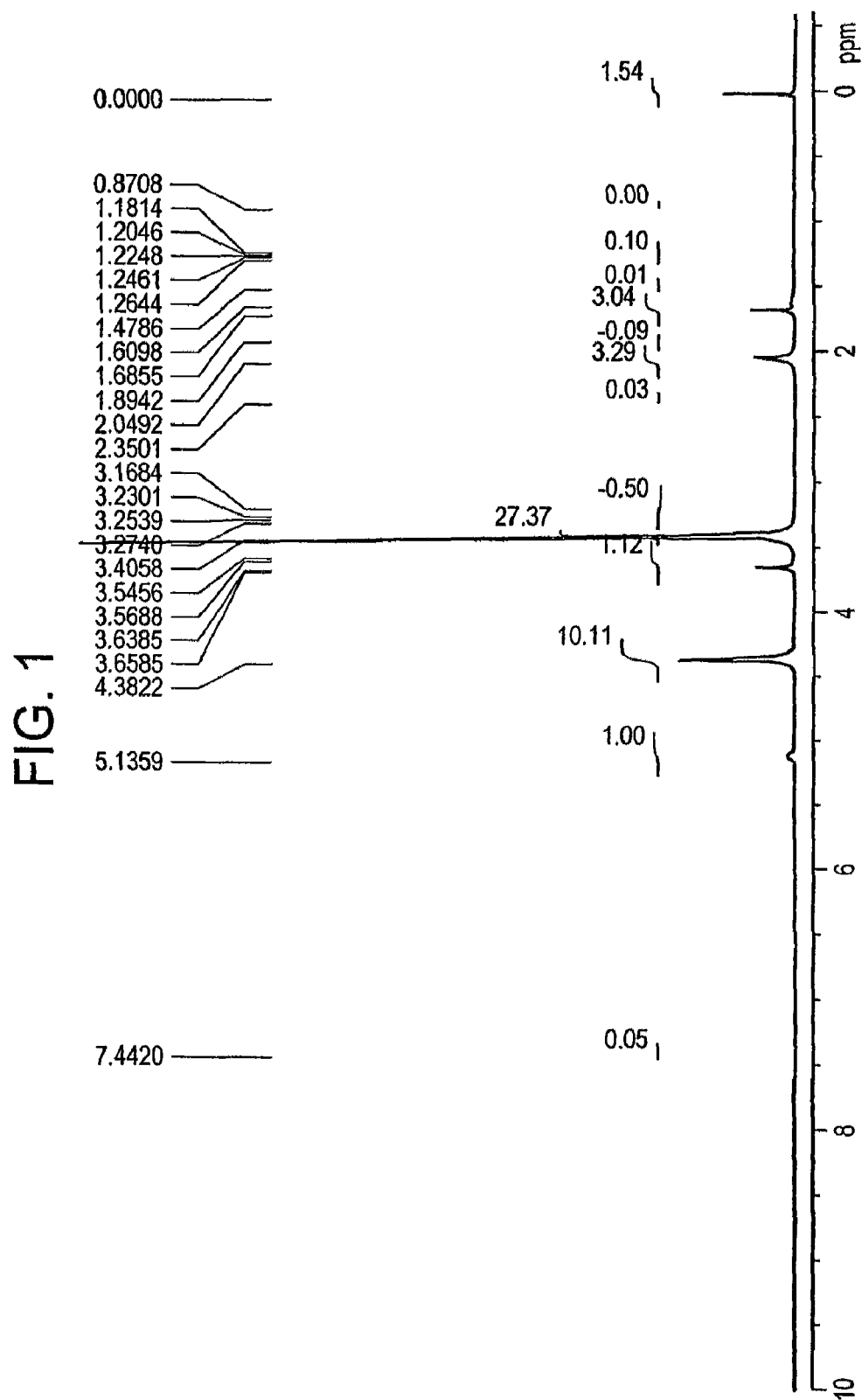

| WO | WO 01/00731 A1 | 1/2001 |
| WO | WO 03/087254 | 10/2003 |
| WO | WO 2004/028269 A1 | 4/2004 |
| WO | WO 2006/016179 A1 | 2/2006 |
| WO | WO 2008/104546 A1 | 9/2008 |

OTHER PUBLICATIONS

International Search Report issued in PCT/EP2008/052325 on Jun. 5, 2008.
U.S. Appl. No. 12/449,622, published as 2010/0215799.
U.S. Appl. No. 12/449,628, published as 2010/0209359.
Office Action dated Jun. 1, 2011 issued in U.S. Appl. No. 12/449,628.
Morjaria et al., "In Vitro Release of Nicotine From Chewing Gum Formulations," Dissolution Technologies, May 2004, pp. 12-15.
International Search Report for International Application No. PCT/EP2008/052326, 3 pp, mailed Jun. 4, 2008.
International Preliminary Report on Patentability for International Application No. PCT/EP2008/052326, issued Aug. 26, 2009.

POLYMERIC MATERIALS HAVING REDUCED TACK, METHODS OF MAKING THE MATERIALS AND CHEWING GUM COMPOSITIONS CONTAINING SUCH MATERIALS

The present invention relates to polymeric materials having reduced tack. It further relates to methods of making such materials and to chewing gum compositions containing such polymeric materials.

Certain hydrocarbon polymers, such as homopolymers of diene monomers, for example, isoprene, exhibit the tendency to adhere to another surface when brought into intimate contact with that surface. However, in some applications of these hydrocarbon polymers, the property of adhesiveness can be a disadvantage. One such application is the use of such materials in chewing gum compositions.

Chewing gum compositions are enjoyed by millions of people around the world. Unfortunately, many users of chewing gum do not, or are not able to, dispose of the chewed gum properly. Chewed gum which is not disposed of properly causes problems because of its tendency to adhere strongly to many surfaces with which it is allowed to come into intimate contact. Because of this, many public areas, particularly pavements, have become disfeatured by the presence of adhered pieces of discarded chewed gum. Chewing gum adhering to a surface is difficult to remove by traditional methods, especially if the gum has been in contact with the surface for more than a short period of time. Such surfaces may be power washed using water applied under high pressure, optionally in combination with scraping, in an attempt to remove adhered gum. Unfortunately, such a method requires the use of large amounts of water, can cause erosion of the surface being treated, is time and energy consuming and can often only be carried out when people have vacated the area being treated in view of the noise created and the large amounts of water required. Other typical methods of cleaning adhered chewed gum from surfaces include scraping, optionally with the use of low temperature material to cause the freezing of the gum, or the use of aggressive chemicals. Thus, methods of cleaning surfaces to remove adhered gum therefrom can be expensive and can, themselves, create a nuisance to the general public.

It has been proposed that the problems mentioned above can be avoided by modifying the properties of chewing gum. For instance, U.S. Pat. No. 5,580,590 discloses an environmentally-friendly chewing gum composition which contains an elastic protein-based polymer. Due to the use of the elastic protein-based polymer, a chewing gum composition is provided that can, after being chewed, be more easily removed from a physical surface to which it is attached.

Chewing gum compositions typically comprise a water-insoluble chewable gum base portion which contains one or more elastomers such as polybutadiene, polyisoprene, butadiene-styrene copolymers, polyisobutylene and isobutylene-isoprene copolymers. These materials exhibit tack and, in time, can become strongly adhered to surfaces. The strong adhesion causes discarded chewing gum to resist separation from surfaces, such as those of pavements. The tack of a material is defined as the ability of that material to form a bond to a surface after brief contact under light pressure.

The present invention is based on the discovery that the tack property of hydrocarbon polymers, for example, natural and synthetic rubbers, can be reduced if the hydrocarbon polymers are modified by attaching directly to their carbon-carbon backbones, certain side chains having hydrophilic character.

Polymeric materials having side chains containing poly(alkylene oxide) groups are disclosed in EP-A-1179564 as being useful in the manufacture of an antistatic resin composition. That document describes a graft copolymer comprising 50-95 wt % of at least one monomer selected from conjugated dienes (such as 1,3-butadiene or isoprene) and acrylate esters (such as ethyl or propyl acrylate), 5-50 wt % of at least one monomer having 4 to 500 alkylene oxide groups and an ethylenically unsaturated bond (a "polyalkylene oxide monomer") and 0-50 wt % of one or more copolymerizable ethylenically-unsaturated monomers. The polyalkylene oxide monomer is typically an acrylate or methacrylate ester of a poly(alkylene glycol). The graft copolymer is, thus, synthesized by a "grafting through" method (also known in the art as "grafting via macromonomers") and, accordingly, the polyalkylene oxide groups are attached to carbon atoms of the polymer backbone of the obtained copolymer via —C(O)O— groups.

Accordingly, a first aspect of the invention provides a polymeric material having reduced tack which has a straight or branched chain carbon-carbon polymer backbone and a multiplicity of side chains attached to the backbone wherein the side chains, which are attached directly to carbon atoms of the polymer backbone, have the formula

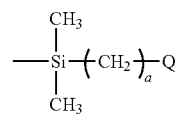

or have the formula

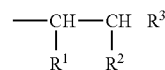

wherein $R^1$ is H, —C(O)O$R^4$ or —C(O)Q and $R^2$ is —C(O)O$R^4$ or —C(O)Q provided that at least one of $R^1$ and $R^2$ is the group —C(O)Q;

$R^3$ is H or —CH$_3$;

$R^4$ is H or an alkyl group having from 1 to 6 carbon atoms;

Q is a group having the formula —O—(YO)$_b$—(ZO)$_c$—$R^5$, wherein each of Y and Z is, independently, an alkylene group having from 2 to 4 carbon atoms and $R^5$ is H or an alkyl group having from 1 to 4 carbon atoms;

a is 3 or 4 and each of b and c is, independently, 0 or an integer of from 1 to 125 provided that the sum b+c has a value in the range of from 10 to 250, preferably 10 to 120.

The polymeric material of the invention has reduced tack, compared to the hydrocarbon polymer which is not modified by the presence of the side chains attached thereto. Furthermore, it is less adherent than the unmodified hydrocarbon polymer to certain surfaces.

The polymeric material of the invention has a carbon-carbon polymer backbone typically derived from a homopolymer of an ethylenically-unsaturated polymerizable hydrocarbon monomer or from a copolymer of two or more ethylenically-unsaturated polymerizable hydrocarbon monomers. By the term "ethylenically-unsaturated polymerizable hydrocarbon monomer" we mean a polymerizable hydrocarbon monomer containing at least one carbon-carbon double bond which is capable of undergoing addition or chain-reaction polymerization to form a straight or branched chain hydrocarbon polymer having a carbon-carbon polymer backbone. According to one preferred embodiment, the carbon-carbon polymer backbone is derived from a homopolymer of an ethylenically-unsaturated polymerizable hydrocarbon monomer containing 4 or 5 carbon atoms, for example, isobutylene (2-methyl-propene). The carbon-carbon polymer backbone may also, according to another embodiment, be derived from a homopolymer of a conjugated diene hydrocarbon monomer, especially one containing 4 or 5 carbon atoms, such as butadiene or isoprene.

As mentioned above, the carbon-carbon polymer backbone may be derived from a copolymer of two or more ethylenically-unsaturated polymerizable hydrocarbon monomers. Preferably, it is derived from a copolymer of two such monomers. For example, it may be derived from a hydrocarbon copolymer of a hydrocarbon monomer having one carbon-carbon double bond and a hydrocarbon monomer having two carbon-carbon double bonds. For example, the carbon-carbon polymer backbone may be derived from a copolymer of isobutylene and isoprene. According to a different embodiment, the carbon-carbon polymer backbone is derived from a butadiene-styrene block copolymer.

It is especially preferred, in the present invention, that the polymeric material has a substantially linear carbon-carbon polymer backbone derived from a straight or branched chain hydrocarbon polymer which is an elastomer at ambient temperatures. Elastomeric polymers have a rubbery nature at temperatures above their glass transition temperature (Tg) and certain synthetic elastomers exhibit this and other properties associated with natural rubber, which is a polymer derived from cis-isoprene (2-methyl-1,3-butadiene) units. In the present invention, the polymeric material preferably has a substantially linear carbon-carbon polymer backbone derived from elastomeric polymers selected from polybutadiene, polyisoprene, butadiene-styrene block copolymers, polyisobutylene and isobutylene-isoprene copolymers, more preferably polybutadiene, polyisoprene, polyisobutylene and isobutylene-isoprene copolymers and most preferably polyisoprene which may be natural rubber or synthetically produced polyisoprene. By the term "substantially linear" as used herein, we mean that the carbon-carbon backbone does not contain a significant degree of long-chain branching.

The hydrocarbon polymer, from which the carbon-carbon polymer backbone of the polymeric material of the invention is derived, will typically have a molecular weight in the range of from 15,000 to 50,000, preferably from 25,000 to 40,000, to ensure that the polymeric material is not overly hard.

As stated above, the polymeric material of the invention contains a multiplicity of side chains attached directly to carbon atoms of the carbon-carbon polymer backbone. The side chains have the formula

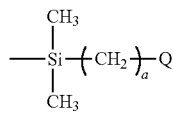

or have the formula

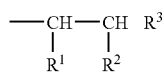

wherein $R^1$ is H, —C(O)OR$^4$ or —C(O)Q and $R^2$ is —C(O)OR$^4$ or —C(O)Q provided that at least one of $R^1$ and $R^2$ is the group —C(O)Q;

$R^3$ is H or —CH$_3$;

$R^4$ is H or an alkyl group having from 1 to 6 carbon atoms;

Q is a group having the formula —O—(YO)$_b$—(ZO)$_c$—R$^5$, wherein each of Y and Z is, independently, an alkylene group having from 2 to 4 carbon atoms and R$^5$ is H or an alkyl group having from 1 to 4 carbon atoms;

a is 3 or 4 and each of b and c is, independently, 0 or an integer of from 1 to 125 provided that the sum b+c has a value in the range of from 10 to 250, preferably from 10 to 120.

According to the above, according to one embodiment of the present invention, the polymeric material has a multiplicity of side chains, attached directly to carbon atoms of the carbon-carbon polymer backbone, having the formula

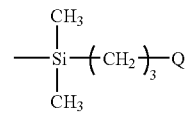

where Q is as defined above.

According to a different embodiment of the present invention, the polymeric material has a multiplicity of side chains, attached directly to the carbon atoms of the carbon-carbon polymer backbone, which side chains have the formula

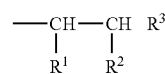

in which $R^1$, $R^2$ and $R^3$ are as defined above. According to a preferred embodiment, the side chains have the above formula in which $R^1$ is H, $R^3$ is —CH$_3$ and $R^2$ is the group —C(O)Q in which Q is as defined above. According to another preferred embodiment, the side chains have the above formula in which $R^3$ is H and in which one of $R^1$ and $R^2$ is the group —C(O)Q and the other one of these groups is —C(O)OR$^4$ in which $R^4$ and Q are as defined above. The group Q, which is present in the side chains mentioned above, has the formula

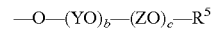

in which Y, Z, $R^5$, b and c are as defined above.

The polymeric material of the invention comprises, as described above, a hydrophobic carbon-carbon polymer backbone onto which are grafted a multiplicity of side chains which, because of their alkyleneoxy content, have a hydrophilic nature. The combination of a hydrophobic backbone with hydrophilic side chains grafted onto the backbone produces an amphiphilic species having properties which depend on the number of and the character of the side chains grafted onto the hydrophobic polymer backbone, i.e. as the number of alkyleneoxy groups in the polymeric material decreases, the hydrophobic character of the polymer backbone begins to dominate the bulk properties of the polymeric material whereas as the number of alkyleneoxy groups in the polymeric material increases, the polymeric material becomes increasingly hydrophilic. Furthermore, as the alkyleneoxy chain length in the grafted side chains increases, the bulk properties of the polymeric material tend to become more similar to those of the corresponding poly(alkylene) polymer. It is, therefore, possible, according to the present invention, to produce a polymeric material having the desired balance of elastomeric and hydrophilic properties. For this reason, multipliers b and c in the group Q defined above are each, independently, 0 to 125 provided that the sum of b+c lies within the range of from 10 to 250. Preferably b+c is in the range of from 10 to 120.

It is not, of course, necessary in the present invention for all of the side chains to share the same values of b and c. It will be apparent that in the polymeric material of the invention different side chains grafted onto the carbon-carbon polymer backbone may have different values of b and of c provided that b lies within the range of 0 to 125 and c lies within the range of from 0 to 125 and provided that the sum of b+c lies within the range of from 10 to 250. Preferably, in order to ensure that the side chains in the polymeric material confer a preferred degree of hydrophilicity to the polymeric material, and therefore a greater reduction in adhesiveness to surfaces, the value of the sum b+c in the side chains will be within the range of 10 to 120, more preferably from 20 to 60, especially from 30 to 50 and most especially from 40 to 45. Although adhesiveness or tack depends on the surface properties of the surface with which the polymeric material may become in intimate contact, it is most preferred in the present invention that the value of b+c is in the range of 40 to 45 so that the polymeric material exhibits reduced tack and reduced adhesiveness to a range of solid surfaces and, as a consequence, is more easily removable in the presence of water from a range of solid surfaces. As discussed above, the presence of poly (oxyalkylene) functionality in the side chains will confer a degree of hydrophilicity to the side chains. The alkylene groups Y and Z in the group Q defined above each, independently, contain 2 to 4 carbon atoms, and examples of such alkylene groups include ethylene, propylene, trimethylene and tetramethylene. However, since the hydrophobicity in the side chains increases with carbon content, it is preferred that both Y and Z are ethylene groups so that the presence of a multiplicity of side chains containing poly(oxyethylene) groups will have the effect of greatly increasing the hydrophilicity of the polymeric material compared to the hydrocarbon polymer containing no such side chains. The group $R^5$ in Q, as defined above, is H or an alkyl group having from 1 to 4 carbon atoms. Preferably, in order not to detract from the hydrophilic nature of the side chains, $R^5$ will not be a group which, itself, introduces a significant degree of hydrophobicity to the side chain and, therefore, $R^5$ is preferably H or —$CH_3$, more preferably H.

As stated above, the properties of the polymeric material depend not only on the character of the side chains grafted onto the carbon-carbon polymer backbone but also on the number of grafted side chains. It is essential according to the invention that a multiplicity of side chains are attached to the backbone. The term "multiplicity" as used herein is intended to have its normal definition, i.e. many, and, therefore, excludes compounds which contain one or only a few grafted side chains which would not be expected to have properties different from those of the hydrocarbon polymer from which the carbon-carbon polymer backbone is derived. The number of side chains grafted onto the carbon-carbon polymer backbone, according to the present invention, will typically be an average of at least one side chain on the carbon-carbon polymer backbone. The actual number of side chains grafted onto the carbon-carbon polymer backbone depends on the identity of the side chain and the method by which the side chain is grafted onto the polymer backbone (and the reaction conditions employed therein). In order to achieve a desired degree of hydrophilicity in the polymeric material, it is preferred that the average of the number of grafted side chains on the polymer backbone is in the range of 5 to 10, i.e. a ratio of backbone to side chains of from 1:5 to 1:10. It will be apparent that the side chains need not be located at regular intervals along the carbon-carbon polymer backbone since the location of attachment of the side chain on the backbone will depend on the positions of suitable attachment locations in the backbone of the hydrocarbon polymer used in the manufacture. For instance, if the hydrocarbon polymer is one that contains carbon-carbon double bonds in the polymer backbone, e.g. polyisoprene, these, or some of these, carbon-carbon double bonds can be utilised in the reaction by which the side chains may be attached to the backbone.

A polymeric material according to the present invention having side chains, attached directly to carbon atoms in the carbon-carbon polymer backbone, wherein the side chains have the formula

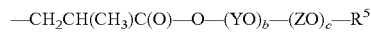

in which Y, Z, $R^5$, b and c are as defined above may be prepared by a method which comprises reacting a straight or branched chain hydrocarbon polymer, in a solvent and in an inert atmosphere, with the monomethacrylate compound

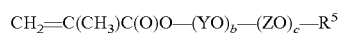

in the presence of a free radical initiator. The reaction between the hydrocarbon polymer and the methacrylate compound is carried out in a suitable solvent and, in this respect, a suitable solvent is one that is a solvent for the reactants and for the free radical initiator used. Typically, the solvent will be an organic non-polar solvent, for example, toluene.

Any free radical initiator may be used provided that it is soluble in the solvent being used and provided that it is able to abstract methylenic hydrogen atoms from the backbone of the hydrocarbon polymer to initiate the grafting reaction. Good results have been obtained using benzoyl peroxide as the free radical initiator in the present invention.

To reduce the possibility of the polymer, in the reaction mixture, crosslinking with itself, it is preferred to carry out the method of the invention in a dilute solution. Typically, the hydrocarbon polymer and the monomethacrylate compound will each be used at a concentration which is less than 11% w/w.

The reaction is carried out in an inert atmosphere. Typically, this may be achieved by purging the reaction vessel containing the solution of the reactants and the initiator with nitrogen for several minutes. The reaction mixture is typically heated to a temperature above ambient temperature to accelerate the reaction and the reaction may be carried out for up to several days with stirring before completion is reached. Typically, the reaction is carried out at a temperature in the range of from 60° to 130° C., preferably 60° to 65°. The reaction may typically be carried out for a period of from 20 to 150 hours. Preferably, it is carried out for a period of from 20 to 50 hours. Following this time, the reaction may be quenched by cooling the reaction vessel rapidly, for instance down to 0° C., or by rapidly diluting the reaction mixture with solvent.

The resulting graft copolymer can be recovered by removing, by evaporating, part of the solvent and then adding methanol to cause precipitation of the desired graft copolymer. This precipitate, when collected, may typically be washed several times in methanol at 60° C. and then dried under vacuum to remove any remaining solvent.

A polymeric material according to the present invention wherein the side chains, attached directly to carbon atoms in the carbon-carbon polymer backbone, have the formula

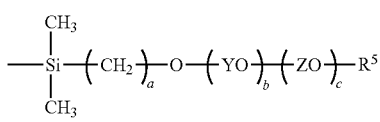

in which Y, Z, $R^5$, a, b and c are as defined above, may be prepared by a method which comprises
(i) reacting a compound of the formula

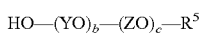

with sodium hydride in a dry organic solvent under an inert atmosphere;
(ii) reacting the product from step (i) with the compound

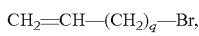

where q is 1 or 2,
to give the compound II

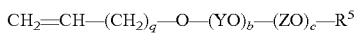 II (iii) reacting the compound II with chlorodimethylsilane to give the compound III

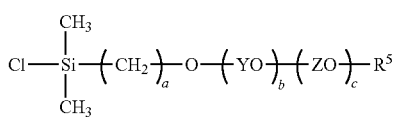 III and
(iv) reducing compound III and reacting the product α-hydrodimethylsilyl polyalkylene oxide with a straight or branched chain hydrocarbon polymer containing a multiplicity of carbon-carbon double bonds in the hydrocarbon polymer backbone in the presence of at transition metal salt.

Preferably, in step (ii) above, the product from step (i) is reacted with 3-bromopropene such that, in the formula given above for the side chain, a is 3.

It will be apparent that a hydrosilylation reaction, as described above (step iv), involves the addition of silane compounds across carbon-carbon double bonds in the hydrocarbon polymer. Hydrosilylation reactions are, in general, catalysed by transition metals or salts thereof, especially those which form electron-rich complexes, for example, Pt(O), Pd(O), Rh(I), Ni(O) and Co(I). We have achieved good results using chloroplatinic acid ($H_2PtCl_6$) as catalyst in this reaction.

According to a preferred embodiment, in step (i) above, sodium hydride is added to a solution, in an organic solvent such as toluene or tetrahydrofuran, and in the absence of water, of poly(ethylene oxide) monomethyl ether under an inert atmosphere, such as argon, at room temperature. After heating the solution, typically with stirring and typically at about 60° C. for about 12 hours, allyl bromide is added and the reaction continued for up to 2 days. The reaction between the α-allyl-ω-methylpoly (ethylene oxide) and chlorodimethylsilane may then be carried out in toluene solution in the presence of chloroplatinic acid for several hours at about 60° C. and the product then reduced, using $LiAlH_4$. The hydrosilylation reaction is then carried out as described above preferably using polyisoprene as the hydrocarbon polymer containing a multiplicity of carbon-carbon double bonds.

Because the method described above relies on addition across a carbon-carbon double bond, it is possible, by choosing an unsaturated hydrocarbon polymer containing a desired amount of unsaturation, to obtain a polymeric material having a predetermined number of side chains attached to the polymer backbone.

A polymeric material according to the present invention wherein the side chains, attached directly to carbon atoms in the carbon-carbon polymer backbone, have the formula

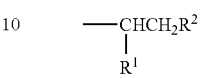

in which one of $R^1$ and $R^2$ is —C(O)Q and the other is —C(O)$OR^4$, where Q and $R^4$ are as defined above, may be made by a method which comprises reacting polyisoprene-graft-maleic anhydride or a monoester derivative thereof with the compound HO—(YO)$_b$—(ZO)$_c$—$R^5$, in which Y, Z, $R^5$, b and c are as defined above. Typically, the reaction is carried out in an organic solvent such as toluene.

In the method described above, the number of side chains attached to the polymer backbone will depend on the number of maleic anhydride grafts on the polyisoprene molecule which can take part in the esterification reaction with the alcohol HO—(YO)$_b$—(ZO)$_c$—$R^5$. For instance, using a polyisoprene-g-maleic anhydride of the formula

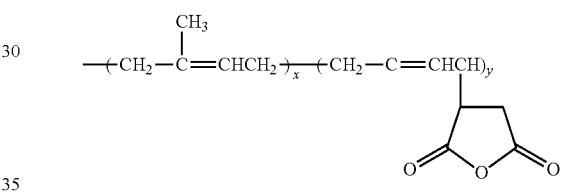

the number of side chains having the general formula given above that can be formed will obviously depend on the value of y. Polyisoprene-graft-maleic anhydride (PIP-g-MA) is available commercially. One such PIP-g-MA, having the CAS No. 139948-75-7, available from the company, Aldrich, has an average molecular weight of about 25,000, a Brookfield Viscosity of 10-50 cP (as a 20 wt % solution in toluene) at 30° C. and a density of 0.92 g/mL (at 25° C.). The monomer ratio of isoprene units to maleic anhydride units in this graft copolymer is 98:2 which indicates that the reaction between this PIP-g-MA and the alcohol described above could produce about 7 side chains per molecule. Polyisoprene-graft-maleic anhydride may be prepared according to techniques described in the literature. For instance, according to Visonte L.L.Y. et al, Polymers for Advanced Technologies, Vol 4, 1993, pp 4.90-495, polyisoprene, dissolved in o-dichlorobenzene, was reacted with maleic anhydride at 180°-190° C. to give the modified isoprene. Various polyisoprene-g-maleic anhydride copolymers with 7, 15, 19, 26 and 29 mol % maleic anhydride were obtained by increasing the reaction time from 5 to 11 hours.

The reaction between the PIP-g-MA and the poly(alkyleneoxy) alcohol is typically carried out in an organic solvent such as toluene and typically in the presence of an activator, for example, triethylemine at elevated temperature. The yield of the ester, in this reaction, may be increased by removal of the water from the reaction mixture by azeotropic distillation since toluene and water form azeotropic mixtures which boil at a lower temperature than any of the components. The poly(alkyleneoxy) alcohol may also be reacted with a monoester derivative of PIP-g-MA. For instance, we have achieved good results using a carboxylated polyisoprene available from the company, Kuraray Co. Ltd., as LIR-410. This carboxylated polyisoprene has the general formula

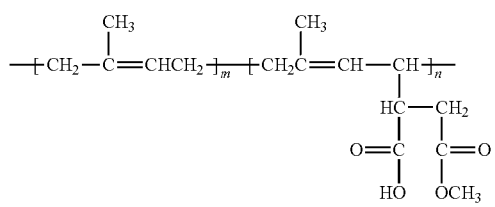

and has a functionality of 10, a molecular weight of about 25,000, a melt viscosity of 180 Pa s at 38° C., specific gravity of 0.92 g/cc and a glass transition temperature of −59° C. The reaction of LIR-410 with the alcohol is typically carried out in an organic solvent such as toluene at an elevated temperature. As described above in the case of the reaction using PIP-g-MA, the yield of ester may be increased by removing water from the reaction mixture by azeotropic distillation. These methods, although they require the use of preformed polyisoprene having carboxy functionality, have the advantage that they involve relatively simple and quick reaction and give high yields.

In view of the low tack property of the polymeric material of the invention, it is possible to make a chewing gum composition which has reduced adhesion to surfaces and which, therefore, is more easily removed from surfaces to which it is adhered, by incorporating the polymeric material of the invention in the chewing gum composition. According to a further aspect, therefore, the present invention provides a chewing gum composition exhibiting reduced adhesion to surfaces comprising a water-insoluble gum base in an amount sufficient to form a chewable gum composition and a sweetening agent, wherein at least part of the water-insoluble gum base comprises a polymeric material as described herein above.

Chewing gum compositions generally comprise a water-soluble portion and a water-insoluble chewable gum base portion. The water-soluble portion of the composition typically contains components such as one or more sweeteners, flavouring agents, colouring agents, acidulants and fillers and may additionally contain other substances such as stabilisers and/or antioxidants. The water-insoluble gum base portion of the composition typically contains, in addition to the one or more elastomers responsible for the chewability characteristic of the chewing gum, elastomer plasticizers, oils and water-insoluble fillers.

Elastomers which are suitable for providing the chewability characteristic of chewing gum compositions are well known in the art. These include, but are not limited to, natural rubber, natural chewable gums and synthetic elastomeric polymers such as polybutadiene, polyisoprene, butadiene-styrene copolymers, polyisobutylene and isobutylene-isoprene copolymers. In the chewing gum composition of the present invention, at least a portion of the elastomer in the composition is replaced by the polymeric material described above, preferably, one having elastomeric properties. Typically, the polymeric material of the present invention will form at least 1% by weight, preferably at least 10% by weight, more preferably at least 50% by weight, of the elastomer component in the chewing gum composition. It is, further, within the scope of the invention to use the polymeric material of the invention as a total replacement for the elastomer component in chewing gum.

The gum base of the chewing gum composition may, as is known in the art, contain one or more plasticizers to soften the elastomer component in the composition to ensure the required level of chewability and a desirable mouth feel of the chewing gum. Plasticizers that are conventionally used to modify the properties of the elastomer in chewing gum compositions include natural rosin esters. Examples of natural rosin esters that may be used include glycerol esters of rosin or hydrogenated rosin and pentaerythritol esters of rosin or hydrogenated rosin. Such materials may be used, as is conventional in the art, in an amount of up to about 70% by weight of the gum base. It is also possible to incorporate into the chewing gum composition one or more other materials that are conventionally used to soften or modify the physical properties of the composition such as glycerol, lecithin and glyceryl monostearate. Such materials, if used, will be incorporated into the composition in an amount which typically may be up to about 15% by weight of the chewing gum composition.

It is conventional to incorporate one or more sweeteners into the chewing gum composition. The amount of sweetening agent used will, of course, depend on the level of sweetness desired in the final product and the sweetness of the sweetener being used. For instance, artificial sweeteners such as aspartame may be used. Sweetness may, of course, be provided by sweeteners which contribute, in addition to sweetness, bulk to the final composition. Examples of bulk sweeteners which are conventionally used in the manufacture of chewing gum include saccharides, such as sucrose, dextrose, xylose, and starch hydrolysates, such as corn syrup, and also non-saccharides, such as the polyols sorbitol, xylitol, mannitol and hydrogenated starch hydrolysates. Bulk sweeteners may be used in an amount of up to 80% by weight of the chewing gum composition and, more typically, in an amount of from about 20 to about 70% by weight.

The chewing gum composition of the present invention will, typically, contain one or more other ingredients which are conventional in the art such as fillers, flavouring agents, waxes, colouring agents, gums, stabilisers, emulsifiers and antioxidants. Such materials may be used in the present invention in accordance with procedures well known in the art of chewing gum manufacture.

The chewing gum composition of the invention may be manufactured according to known techniques. For instance, the method of manufacture will generally comprise heating the ingredients of the gum base together in a mixer to melt the elastomer portion of the gum base and to form a homogeneous mixture of the gum base components. The melted gum base is then mixed with the other components and after these have been thoroughly mixed the resulting mass may be discharged from the mixer and shaped into the desired form, such as by rolling into sheets and cut to the desired size or by casting into pellets. The gum may then be sprinkled with powdered sugar or candy coated according to techniques known to the skilled person.

EXAMPLE 1

To 100 ml of toluene in a round bottom flask were added 0.434 g ($1.14\times10^{-5}$ moles) of polyisoprene having a molecular weight of 38000 and a microstructure 98.8% cis-1,4 and 1.006 g ($5.03\times10^{-4}$ moles) of methoxy poly (ethylene glycol) monomethacrylate having a molecular weight of 2000. The amounts of the reactants used conformed to a ratio of polyisoprene to poly (ethylene glycol) of 1:2.

The mixture was stirred, using a magnetic stirrer, for 2 minutes at 250 to 30° C. until the polyisoprene had dissolved.

Benzoyl peroxide (0.025 g; 1.03×10⁻⁴ moles) was added and the reaction vessel was purged with N₂ for 5 minutes to provide an inert atmosphere. The vessel was heated to 60° C. and maintained at this temperature, with stirring, for 48.5 hours.

At completion, the reaction mixture was cooled rapidly to 0° C. and 85-90% of the toluene was evaporated off under vacuum. Methanol was added to the remaining mixture and a colloidal solution was formed immediately whereby the product was suspended. (The product polymeric material comprised a polymer backbone, derived from polyisoprene, having grafted onto it a plurality of side chains having the formula

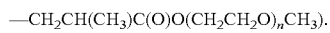

The graft copolymer suspension was centrifuged to recover the solid product and this was then washed in methanol at 60° C. (three times) and dried under vacuum. The ¹H NMR spectrum of the product is shown in FIG. 1. The NMR spectrum was obtained using a 400 MHz Bruker DSX NMR spectrophotometer operating at 400.14 MHz with a solid state probe (HP WB 73A MAS 4BL CP VTN) inserted. A single pulse was used to measure the spectrum where the number of scans was 8, the 90° pulse time was 3 msec, db was 2, the recycling delay was 2 seconds and 6144 data points were collected. Spectra were recorded for spinning speeds of 0, 5 and 9.6 kHz. The NMR spectrum shown in FIG. 1 includes an intense signal at 3.41 ppm. This is believed to be due to the presence of methanol contamination in the sample tested and should, therefore, be ignored. From this ¹H NMR spectrum and the ¹H NMR spectra obtained for polyisoprene and for poly(ethylene glycol) according to which integration values could be obtained, it was possible to calculate the average number of side chains (having a molecular weight of about 2000) per polyisoprene-derived backbone (having a molecular weight of about 38000) as 8.4.

Test Procedures

A. Swelling in Methanol

Poly(ethylene glycol) is hydrophilic and, therefore, does not have good solubility in organic solvents. It was, therefore, decided to investigate the effect of a polar solvent (methanol) on polyisoprene and on the polymeric product obtained in Example 1 above.

0.5 g of polyisoprene was placed in a vial to which was then added 5 ml methanol (test 1).

0.5 g of the graft copolymer obtained in Example 1 above was placed in a second vial to which was then added 5 ml methanol (test 2).

Following the methanol addition in test 1, the polyisoprene exhibited no swelling with the methanol remaining colourless.

Following the methanol addition in test 2, the graft copolymer swelled substantially to the point whereby the polymer chains formed a semi transparent colloidal suspension.

EXAMPLE 2

Reaction of Polyisoprene-Graft-Maleic Anhydride and Poly(Ethylene Glycol) Methyl Ether with Triethylamine Catalyst In this Example, poly(ethylene glycol) was reacted with a polyisoprene-graft-maleic anhydride (PIP-g-MA) available from the company Aldrich. This PIP-g-MA, which has the general formula

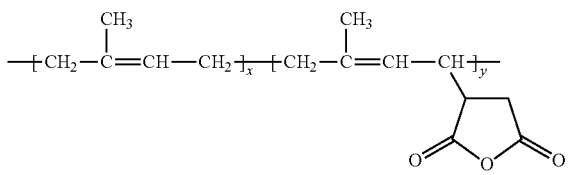

has the CAS No. 139948-75-7 and has an average $M_w$ of approximately 25,000, a Brookfield viscosity of 10-50 cP (as a 20 wt % solution in toluene) at 30° C. and a density of 0.92 g/mL (at 25° C.). The monomer ratio of isoprene units to grafted maleic anhydride units is 98:2.

Polyisoprene-graft-maleic anhydride (PIP-g-MA) (Aldrich), 10 g, was dissolved in 50 ml toluene in a reaction flask, and 2 ml triethylamine catalyst was added and a magnetic stirrer was inserted. Poly(ethylene glycol), 6 g, was then added and an additional 50 ml toluene was added to dissolve it. Once everything had dissolved, the reaction mixture was heated to 85° C. and left for 7 days at this temperature.

The reaction mixture was subsequently cooled to room temperature and then added to 800 ml pentane in a beaker. A white suspension formed and the reaction mixture was left in the fridge overnight (cooled to 8° C. for 24 hours). A phase separation resulted and a white precipitate lingered at the bottom of the beaker while a translucent top phase hung above. Clearly some of the product was soluble in pentane while some of the product was not. (It is believed that as the grafting efficiency increases, the increase in the number of side chains attached to the polymer backbone causes the resulting polymer to become less soluble in pentane, hence making a spectrum of products some of which are soluble in pentane and some of which are not soluble in pentane and thus precipitate out of solution and sediment at the bottom).

The phases were carefully separated and concentrated for analysis. Concentration took place by evaporating any excess pentane from both samples under high vacuum.

EXAMPLE 3

Reaction of Polyisoprene-Graft-Maleic Anhydride with Poly(Ethylene Glycol)Methyl Ether Via Azeotropic Distillation Polyisoprene-graft-maleic anhydride (PIP-g-MA), as used in Example 2, 20 g, and poly(ethylene glycol)methyl ether (PEGME) (also purchased from Aldrich), 12 g, having an average molecular weight of 2000 were weighed out and added to a round bottom flask. Toluene, 200 ml, was then added to the flask and the mixture was stirred by a magnetic stirrer.

Using a Dean Stark trap, the reaction flask was heated at 120° C. for two hours, in order to dry the poly(ethylene glycol)methyl ether by means of azeotropic distillation. The reaction temperature was then increased to 130° C. and heating was continued at that temperature for two hours. After the heating step, 20 ml of liquid distilled off were cloudy, indicating an azeotrope of toluene and water. A further 40 ml liquid were distilled off but this was clear, indicating that all water had been removed.

The reaction was then purged with nitrogen and given 24 hours to progress.

The reaction mixture was cooled to room temperature and then precipitated in 1200 ml pentane making the mixture a cloudy emulsion. The emulsion was put into the fridge (8° C. for 24 hours) allowing the insoluble species to sediment.

The resultant two phases, a soluble upper layer and an insoluble sediment, were separated. The soluble pentane fraction was concentrated in a rotary evaporator. The insoluble sediment was vacuum dried, dissolved in chloroform and precipitated in methanol (800 ml) in order to dissolve any excess PEGME. Again, two phases resulted but separation proved difficult as the new modified hydrophilic polymer formed a colloid in methanol. In order to separate the colloidal polymer from the solvent with excess PEGME, it was necessary to centrifuge the mixture for 45 minutes at 15,000 rpm three times. The white product collected from the bottom of the centrifuge tubes was then dried.

Because the methanol eluent was suspected to contain some polymer, that too was concentrated in the rotary evaporator and dissolved in chloroform. In order to remove any excess PEGME, the solution was precipitated in diethyl ether and dried.

EXAMPLE 4

Reaction of Polyisoprene-Graft-Maleic Anhydride with Poly(Ethylene Glycol)Methyl Ether Via Azeotropic Distillation Polyisoprene-graft-maleic anhydride (PIP-g-MA), as used in Example 2, 262 g, and poly(ethylene glycol)methyl ether (PEGME) (also purchased from Aldrich), 200 g, having an average molecular weight of 2000 were weighed out and added to a three liter round bottom flask fitted with a magnetic stirrer. Prior to this, calcium hydride was added to toluene to remove water from toluene and, after being filtered, 700 ml of this slightly dried toluene was added to the round bottom flask to dissolve the starting materials.

Using a Dean Stark trap, the reaction flask was heated to 120° C., in order to remove any water from the poly(ethylene glycol)methyl ether and from the toluene by means of azeotropic distillation. The reaction temperature was increased to 130° C. and heated at that temperature for two hours (removing 50 ml liquid). Once its unique constant boiling point was reached, the azeotrope (toluene and water) vaporized and condensed as a foggy liquid. Once the liquid which was condensing was clear, all water had been removed and only toluene was evaporating.

The reaction was left for 24 hours at 120° C. and then heated at 130° C. for two hours before removing more solvent by azeotropic distillation. The reaction was left for 48 hours.

Figure 2:
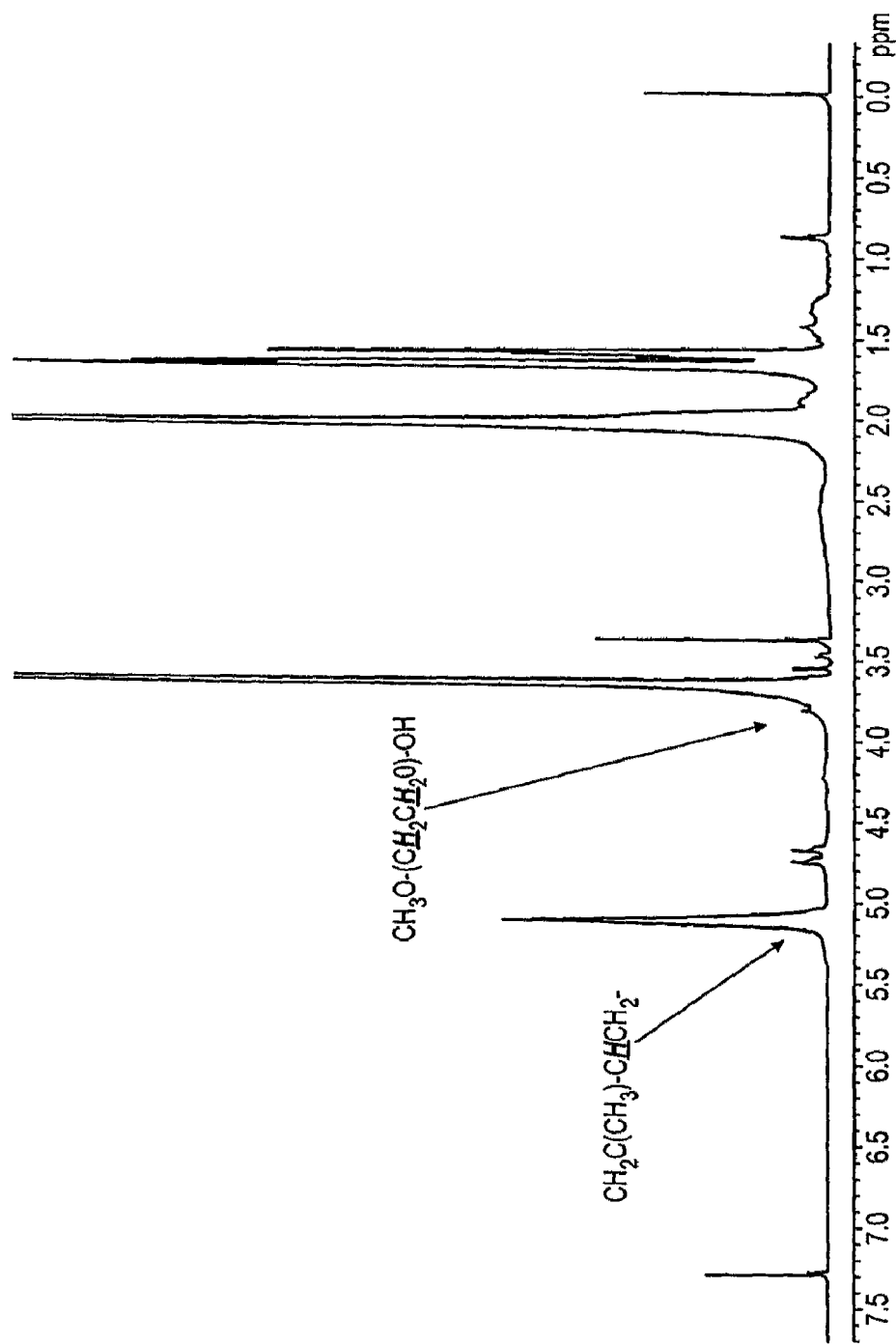

Next, the reaction was cooled to room temperature and precipitated in methanol (4 L). The product was then dried in an oven under high vacuum for 72 hours to remove methanol after which it was washed with excess water (4 L) and dried in an oven under vacuum for 72 hours. The $^1$H NMR spectrum of this product is shown in FIG. 2. The $^1$H NMR spectrum was obtained using a Delta/GX 400 NMR spectrophotometer, operating at 400 MHz, in CDCl$_3$ (deuterated chloroform). The glass transition temperature (Tg) of the product was found to be approximately 50° C. using a Netzsch Simultaneous Thermal Analysis STA-409 EP.

EXAMPLE 5

Reaction of Liquid Isoprene Rubber (LIR-410) with Poly(Ethylene Glycol)Methyl ether Via Azeotropic Distillation In this Example, poly(ethylene glycol)methyl ether was reacted with a carboxylated liquid polyisoprene available from the company Kuraray Co. Ltd. as LIR-410. This carboxylated polyisoprene has the general formula

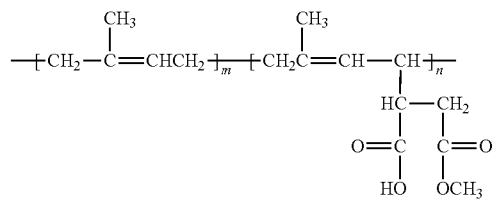

and has a functionality of 10 (i.e. 10 carboxylic acid groups per molecule), a molecular weight of approx. 25,000, a melt viscosity of 180 Pa s at 38° C., a specific gravity of 0.92 g/cc and a glass transition temperature of −59° C.

Carboxylated polyisoprene LIR-410, 320 g, was weighed into a beaker and was dissolved in 850 ml toluene which had been previously slightly dried using calcium hydride as described in Example 4. The toluene solution was placed in a three liter round bottom flask equipped with a magnetic stirrer and to this were added 260 g poly(ethylene glycol)methyl ether (PEGME) (Aldrich) having an average molecular weight of 2000 with stirring until dissolved.

Using a Dean Stark trap, the reaction flask was heated to 130° C. and heating was continued for two hours to remove water from the PEGME and from the toluene by azeotropic distillation after which 80 ml solvent was removed. The reaction mixture was then left for 24 hours at 120° C. The azeotropic distillation cycle (heating for two hours at 130° C. followed by 24 hours at 120° C.) was repeated three times over the following three days and then the reaction mixture was heated at 130° C. for azeotropic distillation for 5 hours, removing 120 ml solvent. As the azeotropic distillation cycle progressed the viscosity of the reaction mixture increased such that it was no longer possible to rotate the magnetic stirrer. The reaction mixture was then cooled to room temperature and washed with water three times using a Buchner funnel. The washed product was then dried in an oven under high vacuum for 72 hours. The glass transition temperature (Tg) was found to be approximately 50° C. using the thermal analysis procedure given in Example 4.

EXAMPLE 6

Hydrosilylation of Polyisoprene with Functionalized Poly(Ethylene Glycol)Methyl Ether The polyisoprene used in this Example had an average molecular weight of 40,000 (Aldrich). The poly(ethylene glycol)methyl ether (Aldrich) had an average molecular weight of 2000.

Poly(ethylene glycol)methyl ether (60 g) was weighed into a reaction flask and heated to 90° C. under high vacuum. To this was added 1.75 g NaH dissolved in tetrahydrofuran and the reaction was allowed to continue for 6-8 hours at 50° C. Allyl bromide (8 g) was then added to the reaction flask and allowed to react for 20 hours. The reaction mixture was heated, under vacuum, to remove the solvent and the product was then washed with benzene. To 30 g of the product, dried under high vacuum and dissolved in 40 ml dry toluene in a round bottom flask, were added H$_2$PtCl$_6$ (0.3 g), dissolved in 4 ml tetrahydrofuran, and chlorodimethylsilane (24 ml) and the mixture was allowed to react for 24 hours. The reaction mixture was heated to 90° C. under high vacuum. Then, dry toluene (45 ml) was added to the reaction flask followed by LiAlH$_4$ (5 g) and the mixture was allowed to react for 72 hours. After this, the mixture was filtered using benzene to wash and the filtrate was collected. The filtrate was rotary evaporated and then added to pentane to give a precipitate. The precipitate was collected by filtration and dried in a rotary evaporator.

Figure 3:
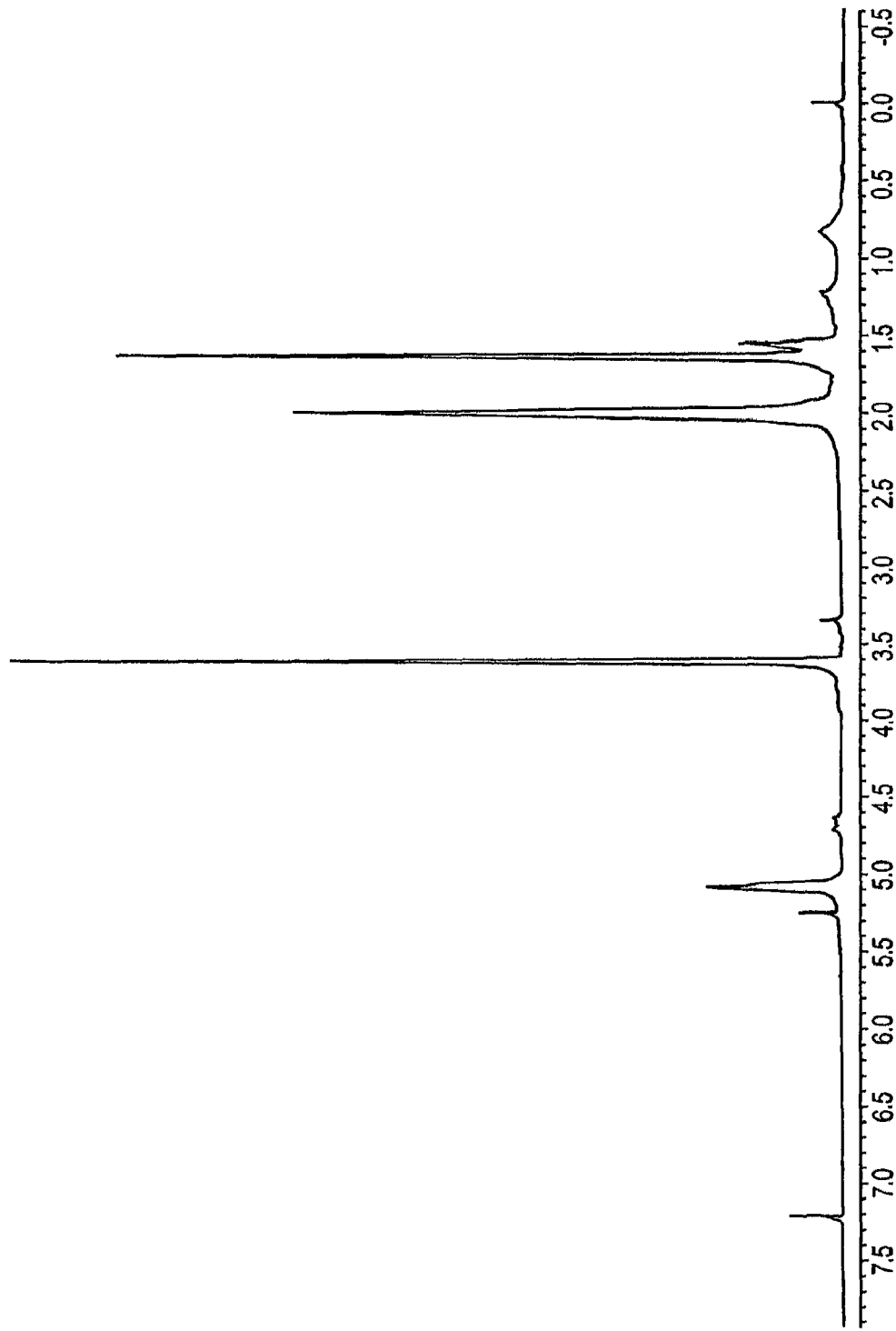

The dry product (8 g) and polyisoprene (5 g) were dissolved in benzene (50 ml) in a reaction flask. To this was then added H$_2$PtCl$_8$ (0.175 g) dissolved in 1 ml tetrahydrofuran, the reaction mixture was heated to 50° C. and the reaction was allowed to proceed at this temperature for 48 hours and then allowed to cool to room temperature. After this, the reaction mixture was dissolved in dichloromethane (200 ml) and filtered through an alumina column containing 50 g Al$_2$O$_3$ twice and washed twice with dichloromethane. The filtrate was collected and then rotary evaporated and then added to pentane causing the formation of a precipitate. The pentane mixture containing the precipitate was filtered and both the filtered off precipitate and the eluent were collected. The collected precipitate was dried and washed with methanol, forming a cloudy solution. The cloudy solution was centrifuged for 30 minutes at 15,000 rpm and the insoluble product collected and dried. The $^1$H NMR spectrum of the product is shown in FIG. 3. The $^1$H NMR spectrum was obtained using a Delta/GX 400 NMR spectrophotometer, operating at 400 MHz, in CDCl$_3$ (deuterated chloroform). It was calculated that the average number of side chains grafted onto each polyisoprene backbone is 145. This insoluble product consisted of isoprene onto which had been grafted side chains of the formula

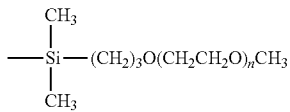

The number of grafted side chains was sufficient to deprive the product of its organic solubility. The eluent collected from the above filtration was concentrated by rotary evaporation. The product that was dissolved in the pentane was considered to consist of isoprene having insufficient grafted side chains such that organic solubility was retained.

Experimental

1. Probe Tack Test

Samples of the polymeric materials obtained in Example 4 (REV-7) and in Example 5 (REV-10) were subjected to probe tack tests. For comparison, samples of polyisoprene (PIP) having a M$_w$ of 40,000, polyisoprene-g-maleic anhydride (starting material in Example 4) (PIP-g-MA) and LIR-410 (starting material in Example 5) were also subjected to the same test procedure.

The samples were prepared for use as follows. In each case, one gram of sample was dissolved in chloroform and the solution was deposited evenly over the surface of a rectangular glass microscope slide of dimensions 2.5 cm×7.5 cm. Following evaporation of the solvent, a film of polymeric material having a uniform thickness of about 0.5 mm remained on the surface of the glass slide.

The probe tack test is a simple procedure for measuring tack. According to the test procedure, a standard stainless steel probe having a circular contact area of diameter 5 mm is brought into contact with the film of the sample deposited on the glass slide (which is held strongly in place) under low contact force (100 g/cm$^2$) for a short contact time (10 s) and is then pulled away at a constant speed (1 cm/s). The maximum force of separation is measured. The apparatus used in these experiments was a probe tack tester Model No. 80-02 (Testing Machines, Inc.) and the experiments were carried out at room temperature. The maximum force of separation was measured in grams and, subsequently, converted to Newtons. The results obtained are shown in the following table.

| Run | PIP | PIP-g-MA | LIR-410 | REV-7 | REV-10 |
|---|---|---|---|---|---|
| 1 | 12.66 | 8.28 | 17.35 | 5.07 | 0 |
| 2 | 6.29 | 5.49 | 18.45 | 1.25 | 0 |
| 3 | 9.57 | 14.72 | 17.41 | 2.90 | 0 |
| 4 | 13.75 | 10.03 | 18.86 | 0.69 | 0 |
| 5 | 9.58 | 13.72 | 16.57 | 3.91 | 0 |
| 6 | 9.97 | 12.43 | 19.61 | 3.47 | 0 |
| Average Force (N) | 10.30 | 10.78 | 18.04 | 2.88 | 0 |
| Standard Deviation | 2.64 | 3.51 | 1.13 | 1.65 | 0 |

The most immediate striking feature of the results given above is the apparent lack of tack exhibited by the sample REV-10. In fact, this provides insight into its non-adhesive character in comparison with the other four materials tested. The maximum force that the apparatus can read is 2000 g (or 19.61 N). When a very sticky material exceeds this maximum, the value taken in the tack test is this maximum value (as is seen in the case of LIR-410).

The general trend in tack for the starting materials tested is LIR-410>PIP-g-MA>PIP. In comparison with these, the modified polymers (REV-7 and REV-10) show a significant decrease in tack. The glass transition temperatures of the modified polymers are substantially higher than those of the starting materials, as a result of the grafted side chains. The starting materials were all in the liquid phase, with a Tg well below room temperature (around −60° C.) allowing facility in wetting the probe. The solid modified polymers (REV-7 and REV-10) were also less sticky as a result of their inability to do so.

Figure 4:
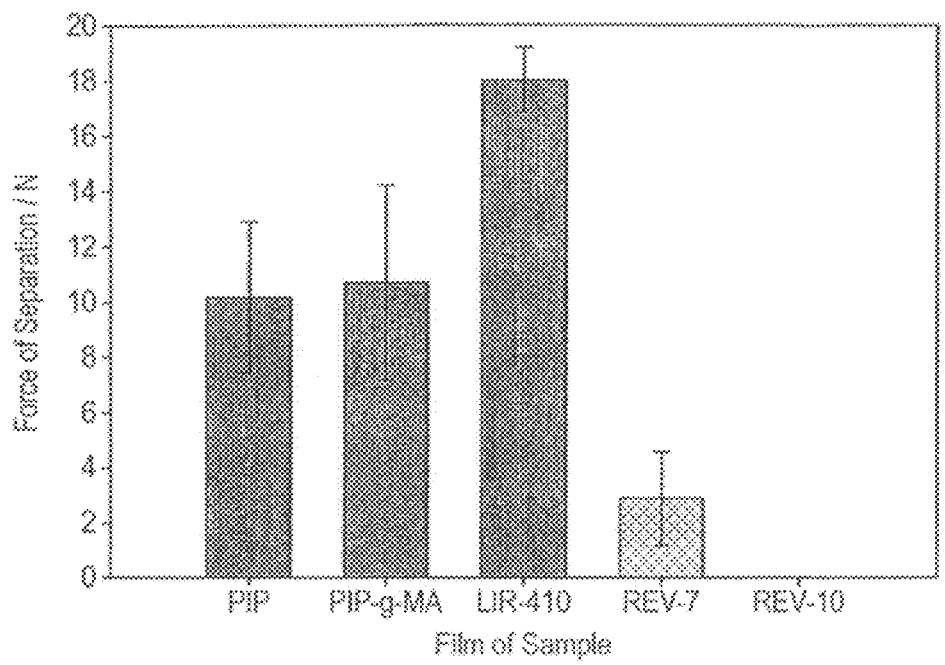

The average force of separation, for each material, as indicated in the table above is shown in the bar chart in FIG. 4. Maximum errors are also shown.

The reproducibility of this experiment is confined by the inaccuracy of certain parameters, such as the contact area between the probe and the sample films and the actual temperature of the samples. However, from a qualitative analysis of the results obtained, it is clear that the reduced adhesion demonstrated by REV-7 and REV-10 at room temperature is a consequence of the side chains attached to the backbone of the polymer.

2. Loop Tack Test

Samples of the polymeric materials obtained in Example 4 (REV-7) and in Example 5 (REV-10) were subjected to loop tack tests. For comparison, samples of polyisoprene (PIP) having an average molecular weight of 40,000 (obtained from Aldrich), polyisoprene-g-maleic anhydride (starting material in Example 4) and LIR-410 (starting material in Example 5) were also subjected to the same test procedure.

The samples were prepared for use as follows. In each case, one gram of sample was dissolved in trichloromethane and the solution was deposited evenly over the surface of a rectangular glass microscope slide of dimensions 2.5 cm×7.5 cm. Following evaporation of the solvent, a film of polymeric material having a uniform thickness of about 0.5 mm remained on the surface of the glass slide.

In all cases, the apparatus was set up as follows:
1) a length of flexible tape having a constant width of 25 mm was formed into a loop by bringing its free ends together and then the free ends were clamped in grips on the test machine which were connected to a load measuring device;
2) the loop, suspended vertically beneath the clamped tape ends, was aligned with, though held above, the glass slide (fixed in the test machine) coated with the film of sample.

The tests were carried out, at room temperature, as follows:
i) the loop is lowered, at a constant rate of 300 mm/min, so that it contacts the sample film on the base plate, until the maximum contact area between the looped tape and the sample film (25 mm×25 mm) is achieved;
ii) after a period of one second in contact with the maximum area of the sample film, the loop is pulled away from the sample film at the same costant rate (300 mm/min) and the maximum force of separate (in N) is measured by the apparatus; and
iii) the loop is then lowered again, at the same constant rate as in i) above, to again contact the maximum area of the sample film for one second and is then pulled away again, at the same constant rate as in i) above, to provide a second measurement of the maximum separation force (in N) between the contact surface of the loop and the sample under test.

The sample film and the loop were then replaced. For each sample, this testing procedure was carried out five times.

Thus, according to the test procedure, each sample film and each loop had two separation force measurements taken from them: the first being after the loop and sample film had been brought into contact for the first time and the second being after the second contact between the loop and the sample film.

The following results were recorded for each of the five films under test. (Note that "1" in the "Contact" column is the measurement taken after the first contact between the loop and the sample film and "2" in the "Contact" column is the measurement taken after the second contact of the loop and the sample film).

PIP

| Contact | Force of Separation/N |
|---|---|
| 1 | 0.43 |
| 2 | 0.54 |
| 1 | 0.68 |
| 2 | 0.49 |
| 1 | 0.72 |
| 2 | 0.50 |
| 1 | 0.66 |
| 2 | 0.59 |
| 1 | 0.42 |
| 2 | 0.49 |
| Average | 0.55 |
| Standard Deviation | 0.11 |

PIP-g-MA

| Contact | Force of Separation/N |
|---|---|
| 1 | 2.00 |
| 2 | 1.55 |
| 1 | 1.31 |
| 2 | 0.72 |
| 1 | 1.58 |
| 2 | 1.42 |
| 1 | 1.89 |
| 2 | 1.47 |
| 1 | 1.23 |
| 2 | 0.94 |
| Average | 1.41 |
| Standard Deviation | 0.39 |

LIR-410

| Contact | Force of Separation/N |
|---|---|
| 1 | 2.35 |
| 2 | 2.16 |
| 1 | 1.94 |
| 2 | 1.75 |
| 1 | 2.19 |
| 2 | 1.83 |
| 1 | 2.15 |
| 2 | 2.06 |
| 1 | 2.55 |
| 2 | 2.38 |
| Average | 2.14 |
| Standard Deviation | 0.25 |

REV-7

| Contact | Force of Separation / N |
|---|---|
| 1 | 0.02 |
| 2 | 0.03 |
| 1 | 0.02 |
| 2 | 0.01 |
| 1 | 0.27 |
| 2 | 0.02 |
| 1 | 0.43 |
| 2 | 0.02 |
| 1 | 0.42 |
| 2 | 0.02 |
| Average | 0.13 |
| Standard Deviation | 0.18 |

REV-10

| Contact | Force of Separation / N |
|---|---|
| 1 | 0.02 |
| 2 | 0.02 |
| 1 | 0.02 |
| 2 | 0.01 |
| 1 | 0.02 |
| 2 | 0.02 |
| 1 | 0.01 |
| 2 | 0.02 |
| 1 | 0.02 |
| 2 | 0.02 |
| Average | 0.02 |
| Standard Deviation | 0.04 |

Figure 5:
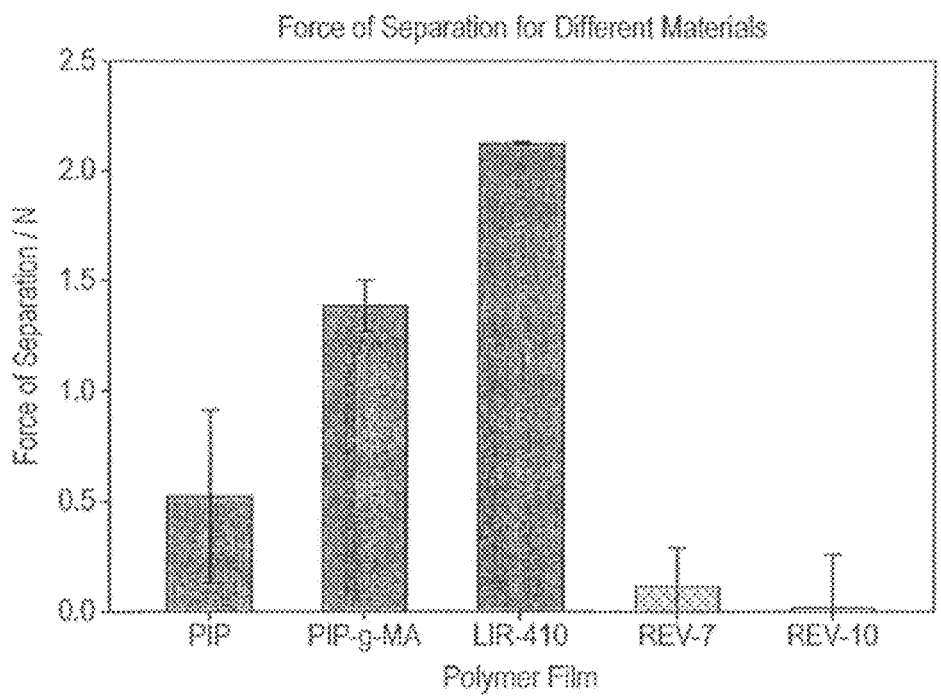

The average values of the maximum force of separation are plotted for the different polymers and their standard deviation is shown as an error bar in FIG. 5. Again, the most striking feature is the lack of tack for REV-10. Its values do not exceed 0.02 N and this is the same value when the loop is brought into contact with any non-adhesive surface, i.e. the material neither wets the probe nor provides any resistance when pulled in the opposite direction.

In the loop tack tests, the general trend shown for the starting materials is the same as previously shown in the probe tack tests, i.e. LIR410>PIP-g-MA>PIP. It is clear, from the loop tack test results, that the introduction of side chains (as defined above), attached to the polymer backbone of polyisoprene, has the consequence of reducing tack.

3. Solubility Tests

The solubilites of the polymeric materials obtained in Example 4 (REV-7) and in Example 5 (REV-10) in various solvents (water, toluene, chloroform, pentane and methanol) were assessed. For comparison, the solubilities, in the same solvents, of samples of polyisoprene (PIP) having a $M_w$ of 40,000, polyisoprene-g-maleic anhydride (starting material in Example 4) (PIP-g-MA), LIR-410 (starting material in Example 5) and poly(ethylene glycol)methyl ether (starting material in Examples 4 and 5) (PEGME) were also subjected to the same test procedure.

In each case, one gram of the sample under test was weighed-into a 20 ml glass vial and solvent was added. The mixture of sample and solvent was shaken vigorously and then placed in an ultrasonic bath for 30 minutes. The mixture was then, again, shaken vigorously and the appearance of the contents of the vial, i.e. whether a clear solution was obtained or not, was observed and recorded. The results are shown in the following table. In the table, 'NO' indicates no dissolution of the sample in the solvent was observed and 'YES' indicates that the sample dissolved in the solvent.

| Solvent | PIP | PIP-g-MA | LIR-410 | PEGME | REV-7 | REV-10 |
|---|---|---|---|---|---|---|
| Water | NO | NO | NO | YES | Breaks up into pieces | Swells slightly |
| Toluene | YES | YES | YES | YES | YES | YES |
| Chloroform | YES | YES | YES | YES | YES | YES |
| Pentane | YES | YES | YES | NO | Forms white suspension | Breaks up and swells slightly |
| Methanol | NO | NO | NO | YES | Forms white suspension | Forms clear blue-gray colloidal dispersion |

From the results given above, it can be seen that:
1. PIP, PIP-g-MA and LIR-410 all behave in the same way for each solvent;
2. PEGME behaves in an opposite way to PIP, PIP-g-MA and LIR-410 in water, pentane and methanol;
3. Toluene and chloroform dissolve all samples (starting materials and products);
4. REV-7 and REV-10 exhibit increased hydrophilicity (compared to the starting materials) in water due to the presence of the hydrophilic side chains in the molecules;
5. REV-7 and REV-10 exhibit relative difficulty in dissolving in pentane, indicating that they behave differently from the isoprene polymers from which they are derived and that they are possibly forming colloidal dispersions;
6. The ability of REV-7 and REV-10 to dissolve, at least partially, or to form colloids, in methanol reveals an affinity of these modified polymers for polar solvents as a result of the presence of the hydrophilic side chains in the molecules.

4. Small Angle Neutron Scattering (SANS)

The SANS measurements were performed on D22 at the ILL, Grenoble, France, using 2 mm path length quartz Hellma cells equilibrated at 298 K. Cold neutrons of 8 Å were used. The detector distance was 17.5 m and the collimation distance was 17.6 m. The Q-resolution with this set-up is 10% ($\Delta Q/Q$). The resultant Q range extended from 0.002 to 0.035 Å$^{-1}$. The measuring time was chosen to give 1 million counts for good statistics.

The investigated samples consisted of 5% solutions of graft copolymers in partially deuterated methanol ($CH_3OD$). The scattering data were analyzed using the Guinier Debye model using the following equation (Debye P. *J. Phys. Coll. Chem.* (1947) 51, 18)

$$I(Q) = \Delta\rho_N^2 \phi_p M(2(e^{-(Q^2 R_G^2)} + Q^2 R_G^2 - 1))/(N_A \rho Q^4 R_G^4)$$

where $\Delta\rho_N$ is the difference in scattering length density of the polymer and solvent, $\phi_p$ is the volume fraction of polymer, M is molecular weight, $N_A$ is Avogadro's number $\rho$ is the physical density, Q is the momentum transfer vector and $R_G$ is the radius of gyration.

Figure 6:
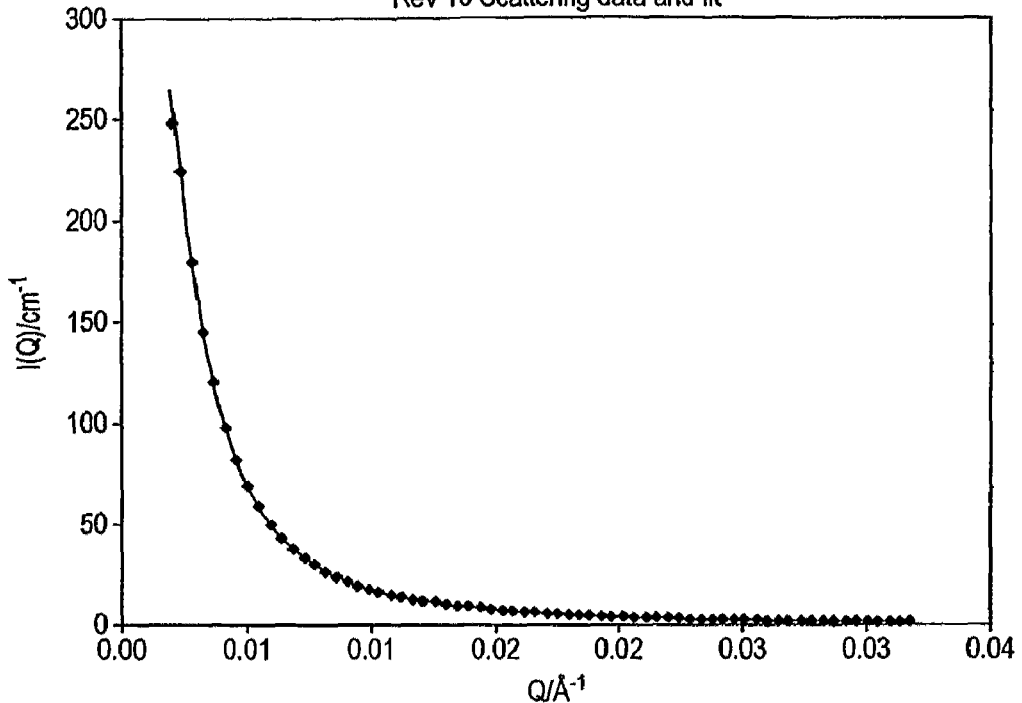
Figure 7:
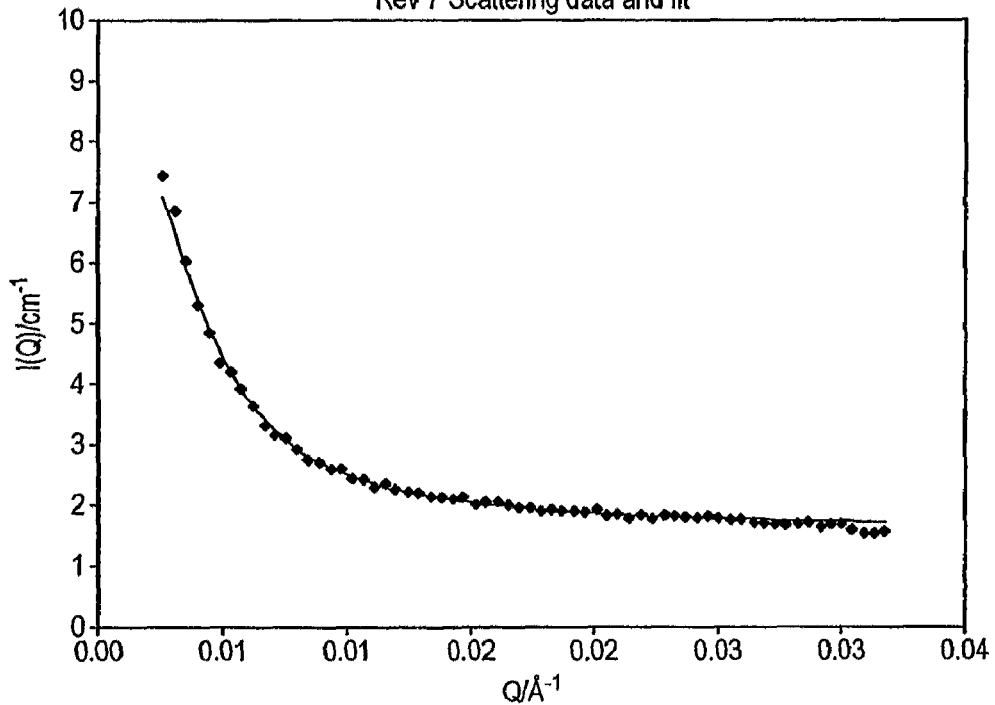

The effective radius of gyration for Rev10 in methanol from the fit shown in FIG. 6 is 673±15 Å. A similar analysis for Rev7 (FIG. 7) gave 408±13 Å. The sizes are an indication of the colloidal nature of these dispersions.

The invention claimed is:

1. A chewing gum composition exhibiting reduced adhesion to surfaces comprising a water-insoluble gum base, in an amount sufficient to form a chewable gum composition, and a sweetening agent, wherein at least part of the water-insoluble gum base comprises a polymeric material having low tack which has a straight or branched chain carbon-carbon polymer backbone and a multiplicity of side chains attached to the backbone wherein the side chains, which are attached directly to carbon atoms of the polymer backbone, have the formula

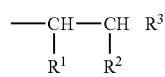

wherein $R^1$ is H, —C(O)OR$^4$ or —C(O)Q and $R^2$ is —C(O)OR$^4$ or —C(O)Q
provided that at least one of $R^1$ and $R^2$ is the group —C(O)Q;
$R^3$ is H or —CH$_3$;
$R^4$ is H or an alkyl group having from 1 to 6 carbon atoms;
Q is a group having the formula —O—(YO)$_b$—(ZO)$_c$—R$^5$, wherein each of Y and Z is, independently, an alkylene group having from 2 to 4 carbon atoms and R$^5$ is H or an alkyl group having from 1 to 4 carbon atoms;
and each of b and c is, independently, 0 or an integer of from 1 to 125 provided that the sum b+c has a value in the range of from 10 to 250, and wherein the carbon-carbon polymer backbone is derived from a homopolymer of an ethylenically-unsaturated polymerizable hydrocarbon monomer containing 5 carbon atoms, or is derived from a homopolymer of isobutylene, or is derived from a copolymer of isobutylene and isoprene.

2. A chewing gum composition according to claim 1, wherein the side chains in the polymeric material have the formula

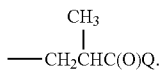

3. A chewing gum composition according to claim 1, wherein the side chains in the polymeric material have the formula

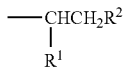

wherein one of $R^1$ and $R^2$ is —C(O)Q and the other is —C(O)OR$^4$.

4. A chewing gum composition according to claim 1, wherein in Q the alkylene groups Y and Z are both —CH$_2$CH$_2$—.

5. A chewing gum composition according to claim 1, wherein in Q the group $R^5$ is H.

6. A chewing gum composition according to claim 1, wherein in Q the group $R^5$ is —CH$_3$.

7. A chewing gum composition according to claim 1, wherein in Q the sum b+c has a value in the range of from 40 to 50.

8. A chewing gum composition according to claim 1, wherein the carbon-carbon polymer backbone is derived from a homopolymer of an ethylenically-unsaturated polymerizable hydrocarbon monomer containing 5 carbon atoms.

9. A chewing gum composition according to claim 1, wherein the carbon-carbon polymer backbone is derived from a homopolymer of isobutylene.

10. A chewing gum composition according to claim 8, wherein the carbon-carbon polymer backbone is derived from a homopolymer of isoprene.

11. A chewing gum composition according to claim 1, wherein the carbon-carbon polymer backbone is derived from a copolymer of isobutylene and isoprene.

12. A chewing gum composition according to claim 1, which additionally comprises one or more ingredients selected from elastomer plasticizers, flavoring agents and fillers.

13. A polymeric material having low tack which has a straight or branched chain carbon-carbon polymer backbone and a multiplicity of side chains attached to the backbone wherein the side chains, which are attached directly to carbon atoms of the polymer backbone, have the formula

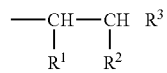

wherein $R^1$ is H, —C(O)OR$^4$ or —C(O)Q and $R^2$ is —C(O)OR$^4$ or —C(O)Q provided that at least one of $R^1$ and $R^2$ is the group —C(O)Q;

$R^3$ is H or —CH$_3$;

$R^4$ is H or an alkyl group having from 1 to 6 carbon atoms;

Q is a group having the formula —O—(YO)$_b$—(ZO)$_c$—R$^5$, wherein each of Y and Z is, independently, an alkylene group having from 2 to 4 carbon atoms and $R^5$ is H or an alkyl group having from 1 to 4 carbon atoms;

and each of b and c is, independently, 0 or an integer of from 1 to 125 provided that the sum b+c has a value in the range of from 10 to 250, and wherein the carbon-carbon polymer backbone is derived from a homopolymer of an ethylenically-unsaturated polymerizable hydrocarbon monomer containing 5 carbon atoms, or is derived from a homopolymer of isobutylene, or is derived from a copolymer of isobutylene and isoprene.

14. A polymeric material according to claim 13, wherein the side chains have the formula

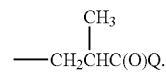

15. A polymeric material according to claim 13, wherein the side chains have the formula

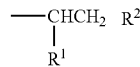

wherein one of $R^1$ and $R^2$ is —C(O)Q and the other is —C(O)OR$^4$.

16. A polymeric material according to claim 13, wherein in Q the alkylene groups Y and Z are both —CH$_2$CH$_2$—.

17. A polymeric material according to claim 13, wherein in Q the group $R^5$ is H.

18. A polymeric material according to claim 13, wherein in Q the group $R^5$ is —CH$_3$.

19. A polymeric material according to claim 13, wherein in Q the sum b+c has a value in the range of from 40 to 50.

20. A polymeric material according to claim 13, wherein the carbon-carbon polymer backbone is derived from a homopolymer of isoprene.

* * * * *